Nov. 10, 1942.  R. C. CALLAN  2,301,250
INTERRUPTING SWITCH
Filed Oct. 19, 1940  2 Sheets—Sheet 1

Inventor
Raymond C. Callan
By
Attorneys

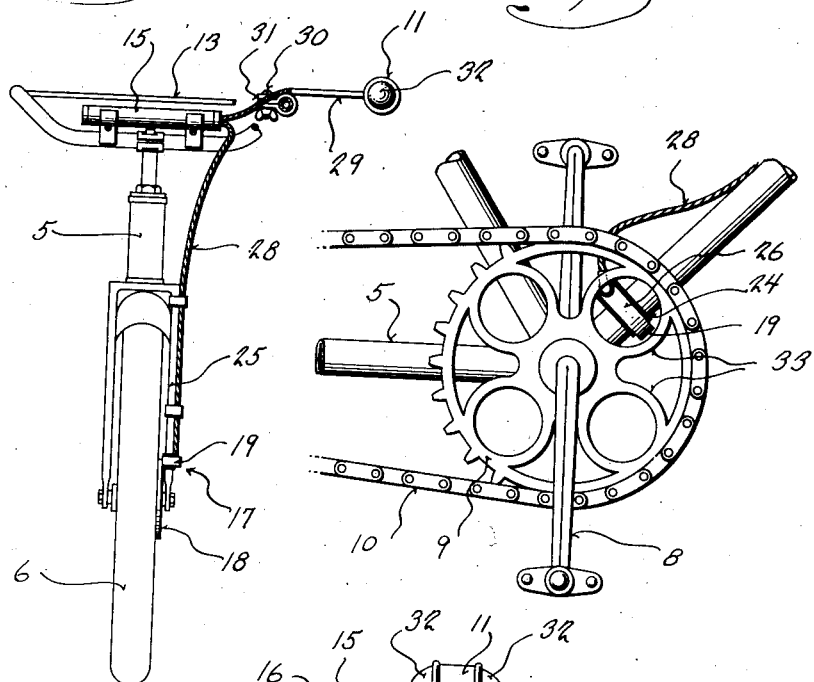

Patented Nov. 10, 1942

2,301,250

UNITED STATES PATENT OFFICE 2,301,250

INTERRUPTING SWITCH

Raymond C. Callan, Milwaukee, Wis.

Application October 19, 1940, Serial No. 361,863

2 Claims. (Cl. 200—24)

This invention relates to improvements in switches particularly adapted for use with lighting equipment for vehicles such as bicycles and other similar wheeled vehicles.

It is an object of this invention to provide an improved switch for intermittently opening and closing the lighting circuit to flash the light on and off.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate several complete examples of the physical embodiment of the invention constructed in accordance with the best modes so far devised for the practical application of the principles thereof, and in which:

Figure 4 is a front view of a bicycle illustrating another application of this invention;

Figure 5 is a side view of the front end of the bicycle illustrating the application shown in Figure 4; and Figure 6 is a side view of that portion of the bicycle adjacent to the pedals and sprocket wheel illustrating another manner of intermittently opening and closing the lighting circuit.

Figure 1:
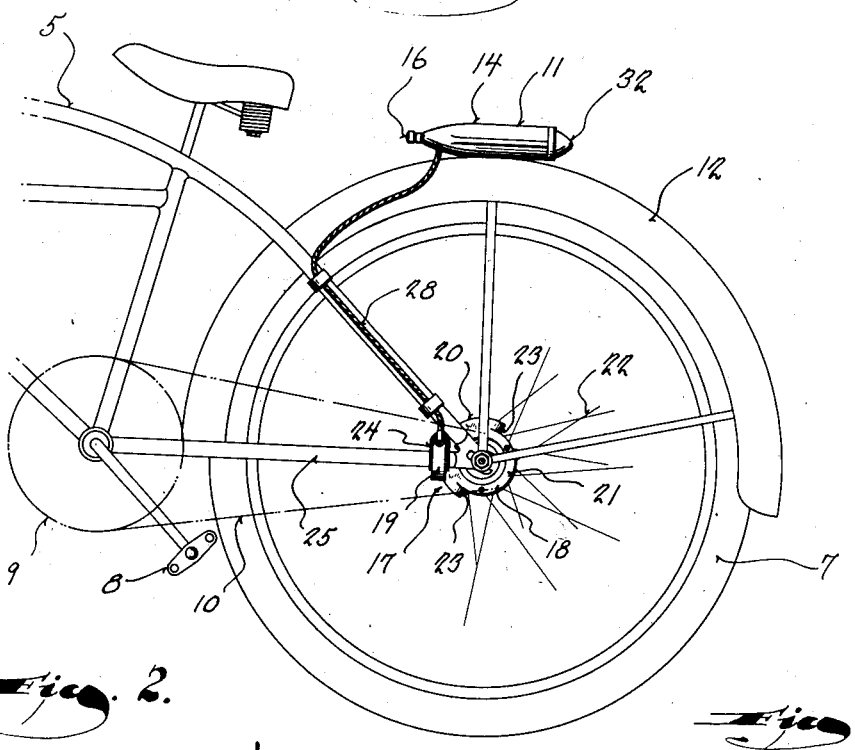
Figure 1 is a side view of the rear portion of a bicycle illustrating one application of this invention.

Referring now particularly to the accompanying drawings in which like numerals indicate like parts, the numeral 5 designates the frame of a bicycle or other similar wheeled vehicle, which, as is customary, is supported on front and rear wheels 6 and 7, respectively. The rear wheel is driven in the customary manner by means of pedals 8, a sprocket wheel 9, and a sprocket chain 10 trained over the sprocket wheel and the usual sprocket on the rear wheel.

The lighting attachment comprises a light 11, which may be mounted on the fender 12 over the rear wheel, as shown in Figure 1, or from the handle bars 13, as shown in Figures 4 and 5. If mounted in the manner shown in Figure 1, the battery for the light is contained within the shell or casing 14 of the light, and when the installation is as illustrated in Figures 4 and 5, it is preferable to house the battery in a separate container 15 clamped to the handle bars or some part of the bicycle frame.

In each instance, a suitable switch 16 is provided by which the lighting circuit may be manually opened and closed, and in each instance, the interrupting switch of this invention, indicated generally by the numeral 17, is connected in the lighting circuit in such a way that when the switch 16 is closed, the interrupting switch intermittently opens and closes the circuit to effect the flashing of the light.

Figure 2:
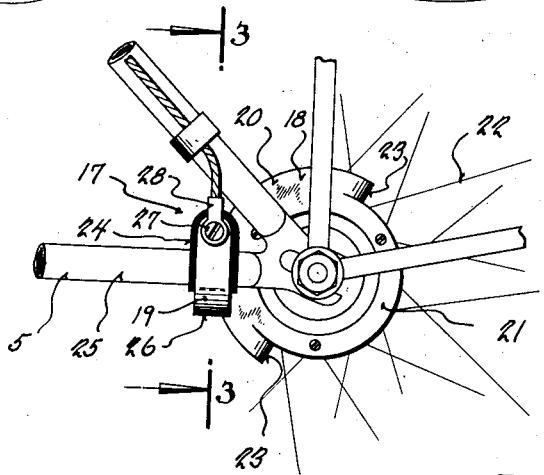
Figure 2 is a detail view on an enlarged scale of part of the structure shown in Figure 1.
Figure 3:
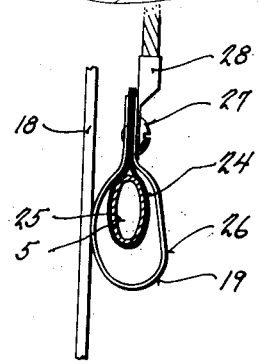
Figure 3 is a cross sectional detail view taken through Figure 2 on the plane of the line 3—3.

This interrupting switch 17, which is best illustrated in Figures 2 and 3, comprises a circumferentially interrupted rotating contactor 18 and a stationary flexible spring contact 19. The rotating contactor 18 is preferably in the form of a ring having a wide portion 20 and a narrow portion 21. The increase in diameter of the wide portion over the narrow portion provides the circumferentially interrupted contactor per se and is so positioned with respect to the stationary contact 19 as to have a wiping engagement therewith as the element 18 rotates.

It is preferable to secure this ring-like element 18 to the spokes 22 of the adjacent wheel. Any suitable manner of fastening it to the spokes may be employed. In the embodiment illustrated in Figure 1, the rotating contactor is secured to the spokes of the rear wheel, and in the constructions shown in Figures 4 and 5, it is attached to the spokes of the front wheel.

The ends 23 of the large diameter or wider portion 20 of the contactor are curved to more readily and gradually effect engagement thereof with the contact 19.

The contact 19 comprises a piece of insulating material 24 either wrapped about or otherwise secured to a stationary frame part 25, and a loop 26 consisting of a strip of resilient flexible metal encircling the insulating material and secured thereto by a screw 27.

The screw 27 may also constitute the clamping screw by which the insulation is held in position and provides a terminal to which a conductor 28 may be connected to have electrical contact with the loop 26.

As clearly shown in Figure 3, the loop 26 is substantially larger than the insulation which it encircles and is so mounted as to be biased toward the plane of the contactor 18 to have a firm wiping contact with the large diameter portion 20 thereof as it rotates. With this arrangement, good contact is provided regardless of the direction of rotation of the contactor.

From the foregoing description taken in connection with the accompanying drawings, it will be readily apparent that this invention provides a simple but highly practical and effective switch for lighting installation for bicycles and other similar wheeled vehicles.

What I claim as my invention is:

1. An interrupting switch comprising: a substantially flat circumferentially interrupted rotatable contactor element; and a stationary contact disposed alongside one face of the contactor element, said stationary contact being in the form of a flexible resilient loop biased to a position projecting a portion thereof into the path of the solid part of the circumferentially interrupted contactor element to make electrical contact therewith.

2. An interrupting switch comprising; a substantially flat circumferentially interrupted rotatable element; an insulating support securable in a fixed position alongside one face of said rotatable element; and a loop formed by a strip of flexible resilient metal embracing the insulating support and having both of its ends secured to the support in a manner projecting a portion of the loop into the path of the solid portions of the circumferentially interrupted rotatable element to have wiping contact therewith.

RAYMOND C. CALLAN.